(12) United States Patent
    Chapman et al.

(10) Patent No.: US 9,999,962 B2
(45) Date of Patent: *Jun. 19, 2018

(54) METHOD FOR LASER CUTTING POLYCRYSTALLINE DIAMOND STRUCTURES

(71) Applicant: US SYNTHETIC CORPORATION, Orem, UT (US)

(72) Inventors: Mark P. Chapman, Provo, UT (US); Ronald W. Ward, Pleasant Grove, UT (US); Nicholas Christensen, Spanish Fork, UT (US); Damon B. Crockett, Mapleton, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 144 days.

This patent is subject to a terminal disclaimer.

(21) Appl. No.: 14/703,741

(22) Filed: May 4, 2015

(65) Prior Publication Data

US 2015/0239097 A1   Aug. 27, 2015

Related U.S. Application Data

(63) Continuation of application No. 13/166,007, filed on Jun. 22, 2011, now Pat. No. 9,062,505.

(51) Int. Cl.
*E21B 10/46*       (2006.01)
*B24D 18/00*      (2006.01)
(Continued)

(52) U.S. Cl.
CPC ............ *B24D 18/00* (2013.01); *B23K 26/364* (2015.10); *B24D 3/04* (2013.01); *E21B 10/46* (2013.01);
(Continued)

(58) Field of Classification Search
CPC ........ E21B 10/36; E21B 10/46; E21B 10/567; E21B 10/5673; E21B 10/5676; B24D 3/00; B23H 1/00
See application file for complete search history.

(56) References Cited

U.S. PATENT DOCUMENTS

| 4,268,276 A | 5/1981 | Bovenkerk |
| 4,322,390 A | 3/1982 | Tolley et al. |

(Continued)

FOREIGN PATENT DOCUMENTS

| EP | 0543461 | 5/1993 |
| GB | 1068617 | 5/1967 |

(Continued)

OTHER PUBLICATIONS

US 8,827,010, 09/2014, Peterson et al. (withdrawn)

(Continued)

*Primary Examiner* — Pegah Parvini
(74) *Attorney, Agent, or Firm* — Dorsey & Whitney LLP

(57) ABSTRACT

Methods of laser cutting polycrystalline diamond tables and polycrystalline diamond compacts are disclosed. Laser cutting of the polycrystalline diamond table provides an alternative to electrical-discharge machining ("EDM"), grinding with a diamond wheel, or lapping with a diamond wheel. Grinding or lapping with a diamond wheel is relatively slow and expensive, as diamond is used to remove a diamond material. EDM cutting of the polycrystalline diamond table is sometimes impractical or even impossible, particularly when the cobalt or other infiltrant or catalyst concentration within the polycrystalline diamond table is very low (e.g., in the case of a leached polycrystalline diamond table). As such, laser cutting provides a valuable alternative machining method that may be employed in various processes such as laser scribing, laser ablation, and laser lapping.

25 Claims, 14 Drawing Sheets

(51) Int. Cl.
  *E21B 10/567* (2006.01)
  *B24D 3/04* (2006.01)
  *B23K 26/364* (2014.01)

(52) U.S. Cl.
  CPC ........ *E21B 10/567* (2013.01); *E21B 10/5673* (2013.01); *E21B 10/5676* (2013.01)

(56) References Cited

U.S. PATENT DOCUMENTS

| | | |
|---|---|---|
| T102,901 I4 | 4/1983 | Offenbacher |
| 4,410,054 A | 10/1983 | Nagel et al. |
| 4,468,138 A | 8/1984 | Nagel |
| 4,560,014 A | 12/1985 | Geczy |
| 4,592,433 A | 6/1986 | Dennis |
| 4,629,373 A | 12/1986 | Hall |
| 4,662,348 A | 5/1987 | Hall et al. |
| 4,738,322 A | 4/1988 | Hall et al. |
| 4,784,023 A | 11/1988 | Dennis |
| 4,789,251 A | 12/1988 | McPherson et al. |
| 4,811,801 A | 3/1989 | Salesky et al. |
| 4,852,671 A | 8/1989 | Southland |
| 4,913,247 A | 4/1990 | Jones |
| 4,951,762 A | 8/1990 | Lundell |
| 4,984,642 A | 1/1991 | Renard et al. |
| 4,993,505 A | 2/1991 | Packer et al. |
| 5,016,718 A | 5/1991 | Tandberg |
| 5,054,246 A | 10/1991 | Phaal et al. |
| 5,092,687 A | 3/1992 | Hall |
| 5,120,327 A | 6/1992 | Dennis |
| 5,135,061 A | 8/1992 | Newton, Jr. |
| 5,154,245 A | 10/1992 | Waldenstrom et al. |
| 5,172,778 A | 12/1992 | Tibbetts |
| 5,180,022 A | 1/1993 | Brady |
| 5,267,398 A | 12/1993 | Hall |
| 5,342,129 A | 8/1994 | Dennis et al. |
| 5,351,772 A | 10/1994 | Smith |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |
| 5,512,235 A | 4/1996 | Cerutti et al. |
| 5,544,713 A | 8/1996 | Dennis |
| 5,558,170 A | 9/1996 | Thigpen et al. |
| 5,560,716 A | 10/1996 | Tank et al. |
| 5,590,729 A | 1/1997 | Cooley et al. |
| 5,667,028 A | 9/1997 | Truax et al. |
| 5,678,645 A | 10/1997 | Tibbitts et al. |
| 5,788,001 A | 8/1998 | Matthias et al. |
| 5,848,657 A | 12/1998 | Flood et al. |
| 5,979,578 A | 11/1999 | Packer |
| 6,045,440 A | 4/2000 | Johnson et al. |
| 6,135,219 A | 10/2000 | Scott |
| 6,145,608 A | 11/2000 | Lund et al. |
| 6,187,068 B1 | 2/2001 | Frushour et al. |
| 6,190,096 B1 | 2/2001 | Arthur |
| 6,258,139 B1 | 7/2001 | Jensen |
| 6,272,753 B2 | 8/2001 | Packer |
| 6,315,067 B1 | 11/2001 | Fielder |
| 6,419,034 B1 | 7/2002 | Belnap et al. |
| 6,447,560 B2 | 9/2002 | Jensen |
| 6,460,637 B1 | 10/2002 | Siracki et al. |
| 6,793,681 B1 | 9/2004 | Pope et al. |
| 7,108,598 B1 | 9/2006 | Galloway |
| 7,152,701 B2 | 12/2006 | Butland et al. |
| 7,316,279 B2 | 1/2008 | Wiseman et al. |
| 7,552,782 B1 | 6/2009 | Sexton et al. |
| 7,553,740 B2 | 6/2009 | Sharp et al. |
| 7,559,695 B2 | 7/2009 | Sexton et al. |
| 7,585,342 B2 | 9/2009 | Cho |
| 7,608,333 B2 | 10/2009 | Eyre |
| 7,670,406 B2 | 3/2010 | Belashchenko |
| 7,670,407 B2 | 3/2010 | Pretorius |
| 7,703,982 B2 | 4/2010 | Cooley |
| 7,866,418 B2 | 1/2011 | Bertagnolli et al. |
| 7,870,913 B1 | 1/2011 | Sexton et al. |
| 7,896,551 B2 | 3/2011 | Cooley et al. |
| 7,901,137 B1 | 3/2011 | Peterson |
| 7,946,768 B2 | 5/2011 | Cooley et al. |
| 7,998,573 B2 | 8/2011 | Qian et al. |
| 8,020,471 B2 | 9/2011 | Hall et al. |
| 8,034,136 B2 | 10/2011 | Sani |
| 8,147,142 B1 | 4/2012 | Peterson |
| 8,157,029 B2 | 4/2012 | Zhang et al. |
| 8,383,984 B2 | 2/2013 | Osako et al. |
| 8,393,419 B1 | 3/2013 | Burton |
| 8,534,391 B2 | 9/2013 | Wirth |
| 8,561,727 B1 | 10/2013 | Pope et al. |
| 8,739,904 B2 | 6/2014 | Patel |
| 8,764,864 B1 | 7/2014 | Miess et al. |
| 8,807,247 B2 | 8/2014 | Scott et al. |
| 8,863,864 B1 | 10/2014 | Miess |
| 8,950,519 B2 | 2/2015 | Gonzalez et al. |
| 9,062,505 B2 * | 6/2015 | Chapman ................ E21B 10/46 |
| 2001/0037609 A1 | 11/2001 | Jensen et al. |
| 2002/0179572 A1 * | 12/2002 | McPhillips ............. B23H 7/12 |
| | | 219/69.2 |
| 2004/0007394 A1 | 1/2004 | Griffin |
| 2004/0190804 A1 | 9/2004 | John et al. |
| 2005/0050801 A1 * | 3/2005 | Cho ....................... B22F 7/008 |
| | | 51/293 |
| 2005/0077091 A1 | 4/2005 | Butland et al. |
| 2005/0133277 A1 | 6/2005 | Dixon |
| 2006/0102389 A1 | 5/2006 | Wiseman et al. |
| 2006/0219439 A1 * | 10/2006 | Shen ..................... E21B 10/573 |
| | | 175/57 |
| 2007/0034147 A1 | 2/2007 | Wort et al. |
| 2007/0046119 A1 | 3/2007 | Cooley |
| 2007/0181348 A1 | 8/2007 | Lancaster et al. |
| 2007/0187155 A1 | 8/2007 | Middlemiss |
| 2009/0114628 A1 | 5/2009 | DiGiovanni |
| 2009/0173547 A1 | 7/2009 | Voronin et al. |
| 2009/0242525 A1 | 10/2009 | O'Brien et al. |
| 2009/0260877 A1 | 10/2009 | Wirth |
| 2010/0218995 A1 | 9/2010 | Sexton et al. |
| 2010/0226759 A1 | 9/2010 | Cooley et al. |
| 2010/0270088 A1 | 10/2010 | Zhang et al. |
| 2010/0314176 A1 | 12/2010 | Zhang et al. |
| 2011/0017520 A1 | 1/2011 | Webb |
| 2011/0031036 A1 | 2/2011 | Patel |
| 2011/0056141 A1 | 3/2011 | Miess et al. |
| 2011/0073379 A1 | 3/2011 | DiGiovanni et al. |
| 2011/0174544 A1 | 7/2011 | Scott et al. |
| 2011/0174549 A1 | 7/2011 | Dolan et al. |
| 2011/0226532 A1 * | 9/2011 | Jonker .................... B22F 7/062 |
| | | 175/57 |
| 2011/0259642 A1 | 10/2011 | DiGiovanni et al. |
| 2012/0048626 A1 | 3/2012 | Bellin |
| 2012/0175652 A1 | 7/2012 | Chyr et al. |
| 2012/0281938 A1 | 11/2012 | Peterson et al. |
| 2012/0325563 A1 | 12/2012 | Scott et al. |
| 2013/0068537 A1 | 3/2013 | DiGiovanni |
| 2013/0156357 A1 | 6/2013 | Peterson et al. |
| 2013/0167446 A1 | 7/2013 | Lin et al. |
| 2013/0255161 A1 | 10/2013 | Lin et al. |
| 2014/0366456 A1 | 12/2014 | Chapman et al. |
| 2014/0367176 A1 | 12/2014 | Gonzalez et al. |
| 2014/0367177 A1 | 12/2014 | Gonzalez et al. |
| 2014/0373458 A1 | 12/2014 | Miess |
| 2016/0186805 A1 | 6/2016 | Peterson |
| 2017/0120422 A9 | 5/2017 | Stockey et al. |
| 2017/0292332 A1 | 10/2017 | Gledhill |

FOREIGN PATENT DOCUMENTS

| | | | | |
|---|---|---|---|---|
| GB | | 2510341 | * 8/2014 | ............ E21B 10/56 |
| JP | | H06-170571 | 6/1994 | |

OTHER PUBLICATIONS

U.S. Appl. No. 11/545,929, filed Oct. 10, 2006, Bertagnolli.
U.S. Appl. No. 12/558,939, filed Sep. 14, 2009, Miess et al.
U.S. Appl. No. 12/961,787, filed Dec. 7, 2010, Mukhopadhyay et al.

(56) References Cited

OTHER PUBLICATIONS

Davis, J.R. Editor, "Corrosion Behavior of Nickel and Nickel Alloys", Nickel, Cobalt, and Their Alloys, ASM Specialty Handbook, Jan. 1, 2000, pp. 157.
Davis, J.R., Editor, "Failures from Various Mechanisms and Related Environmental Factors", Metals Handbook Desk Edition, Second Edition (ASM International), published Dec. 1998, pp. 1231-1232.
Howes, "The Graphitzation of Diamond", 1962, Proc. Phys. Soc., vol. 80, pp. 648-662.
Joseph, B., et al.—Liquid metal embrittlement: A state-of-the-art appraisal—The European Physical Journal Applied Physics, 1999.
Pilkey, "Formulas for Stress, Strain, and Structural Matrices", 2005, John Wiley & Sons, 2nd Edition, pp. 255-305.
Smith International, Geodiamond, "Quick Cutter", available as of Nov. 9, 2010, (3 pages).
Tze-Pin Lin, Michael Hood, George A. Cooper, and Redd H. Smith, Residual Stresses in Polycrystalline Diamond Compacts, J. Am. Ceram. Soc. 77[6] pp. 1562-1568 (1994).
International Search Report and Written Opinion from International Application No. PCT/US2013/033324 dated Aug. 30, 2013.
U.S. Appl. No. 13/166,007, dated Oct. 23, 2013, Office Action.
U.S. Appl. No. 13/166,007, dated May 21, 2014, Office Action.
U.S. Appl. No. 13/166,007, dated Sep. 10, 2014, Office Action.
U.S. Appl. No. 13/166,007, dated Feb. 3, 2015, Notice of Allowance.
U.S. Appl. No. 13/116,566, dated Aug. 1, 2013, Office Action.
U.S. Appl. No. 13/116,566, dated Oct. 2, 2013, Office Action.
U.S. Appl. No. 13/116,566, dated Mar. 26, 2014, Office Action.
U.S. Appl. No. 13/116,566, dated Jun. 9, 2014, Notice of Allowance.
U.S. Appl. No. 13/116,566, dated Oct. 1, 2014, Issue Notification.
U.S. Appl. No. 13/234,252, dated Oct. 4, 2013, Office Action.
U.S. Appl. No. 13/234,252, dated Jan. 28, 2014, Office Action.
U.S. Appl. No. 13/234,252, dated May 5, 2014, Notice of Allowance.
U.S. Appl. No. 13/234,252, dated Aug. 20, 2014, Issue Notification.
U.S. Appl. No. 13/234,252, dated Sep. 23, 2014, Notice of Allowance.
U.S. Appl. No. 13/234,252, dated Jan. 21, 2015, Issue Notification.
U.S. Appl. No. 13/432,224, dated Jul. 3, 2014, Office Action.
U.S. Appl. No. 13/432,224, dated Sep. 10, 2014, Office Action.
U.S. Appl. No. 13/432,224, dated Apr. 7, 2015, Office Action.
U.S. Appl. No. 14/432,224, dated Nov. 23, 2015, Notice of Allowance.
U.S. Appl. No. 14/452,206, dated Oct. 23, 2015, Office Action.
U.S. Appl. No. 14/452,206, dated Jan. 7, 2016, Notice of Allowance.
U.S. Appl. No. 15/065,192, filed Mar. 9, 2016, Peterson et al.
U.S. Appl. No. 15/134,158, filed Apr. 20, 2016, Gonzalez et al.
U.S. Appl. No. 13/432,224, dated Mar. 9, 2016, Issue Notification.
U.S. Appl. No. 14/452,206, dated Apr. 20, 2016, Issue Notification.
U.S. Appl. No. 13/166,007, dated May 11, 2015, Corrected Notice of Allowance.
U.S. Appl. No. 13/166,007, dated Jun. 3, 2015, Issue Notification.
U.S. Appl. No. 13/432,224, dated Jul. 2, 2015, Notice of Allowance.
U.S. Appl. No. 14/452,206, dated Jun. 30, 2015, Office Action.
U.S. Appl. No. 14/481,592, dated Jun. 15, 2016, Restriction Requirement.
U.S. Appl. No. 14/481,592, dated Aug. 24, 2016, Office Action.
U.S. Appl. No. 14/481,592, dated Mar. 6, 2017, Office Action.
U.S. Appl. No. 14/481,592, dated May 12, 2017, NOA.
U.S. Appl. No. 15/724,546, filed Oct. 4, 2017, Chapman, et al.
U.S. Appl. No. 14/481,592, filed Aug. 23, 2017, Issue Notification.
U.S. Appl. No. 15/134,158, filed Jan. 23, 2018, Office Action.

* cited by examiner

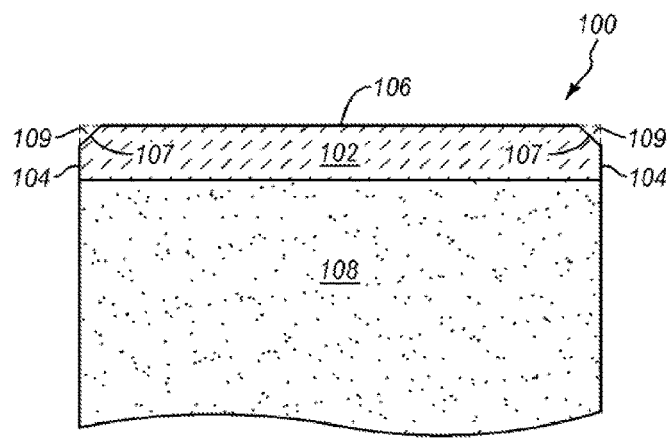
*Fig. 6*
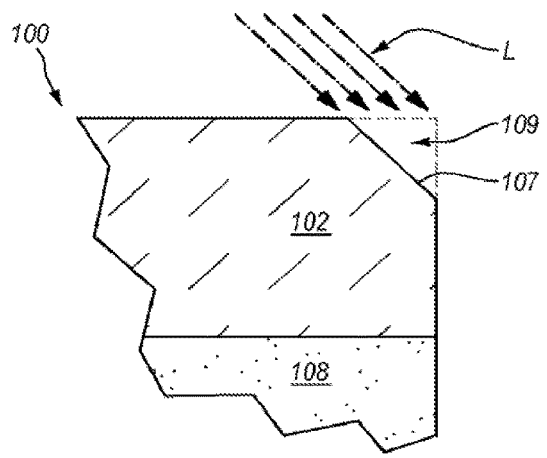 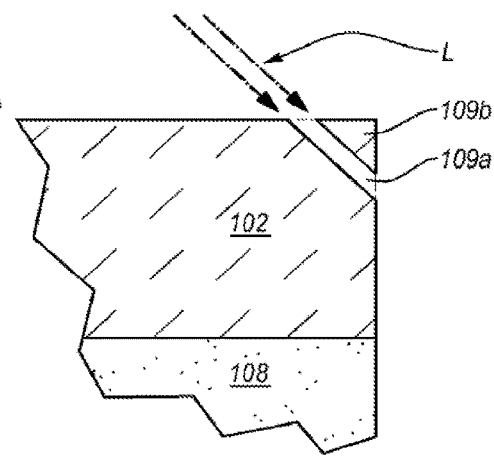
*Fig. 6A*  *Fig. 6B*
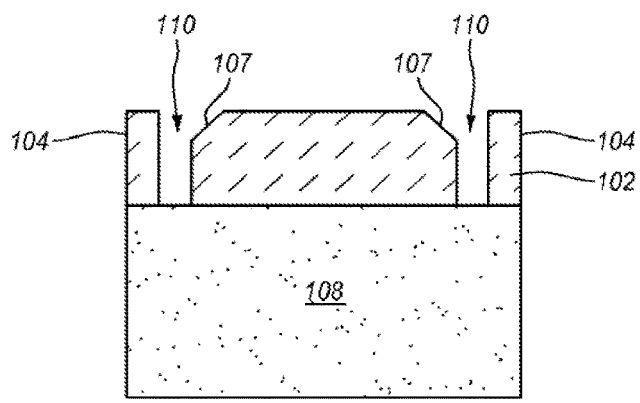
*Fig. 6C*

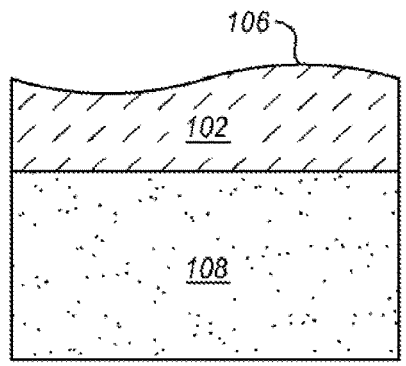
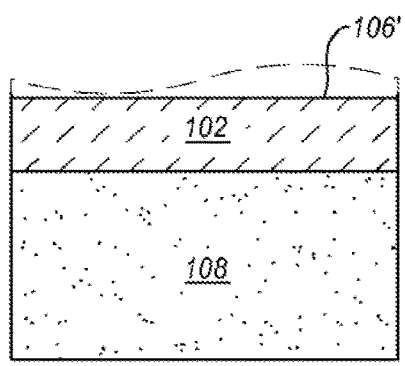
*Fig. 8A*  *Fig. 8B*
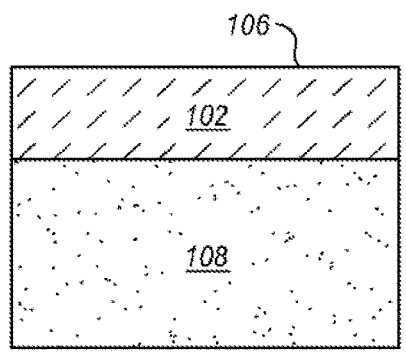
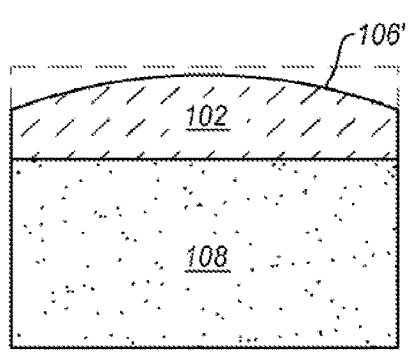
*Fig. 9A*  *Fig. 9B*
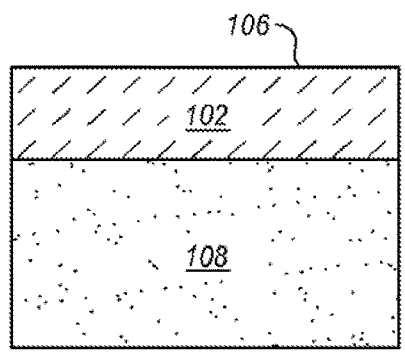
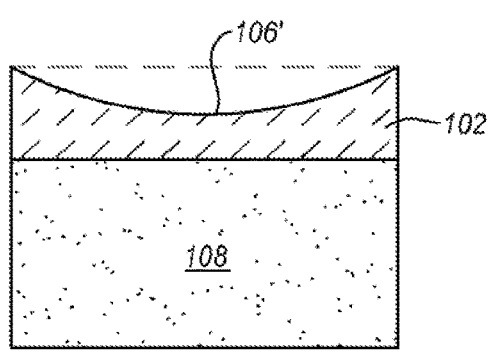
*Fig. 10A*  *Fig. 10B*

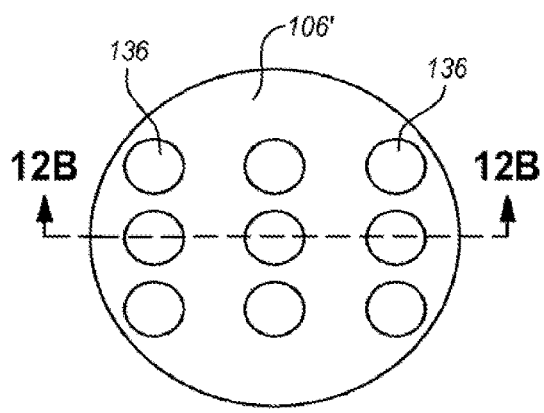
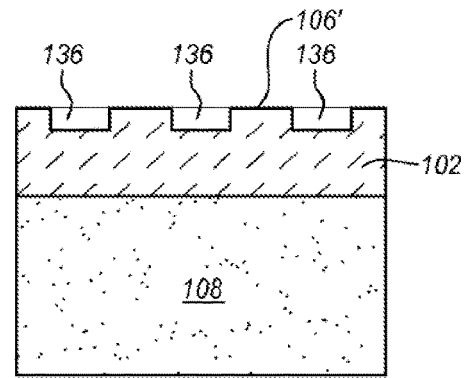
Fig. 12A   Fig. 12B
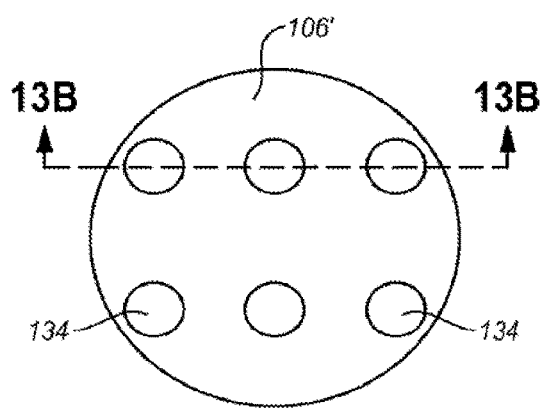
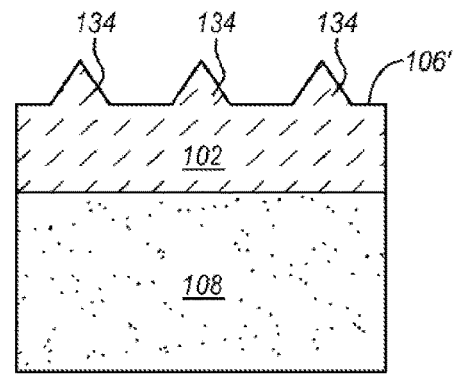
Fig. 13A   Fig. 13B

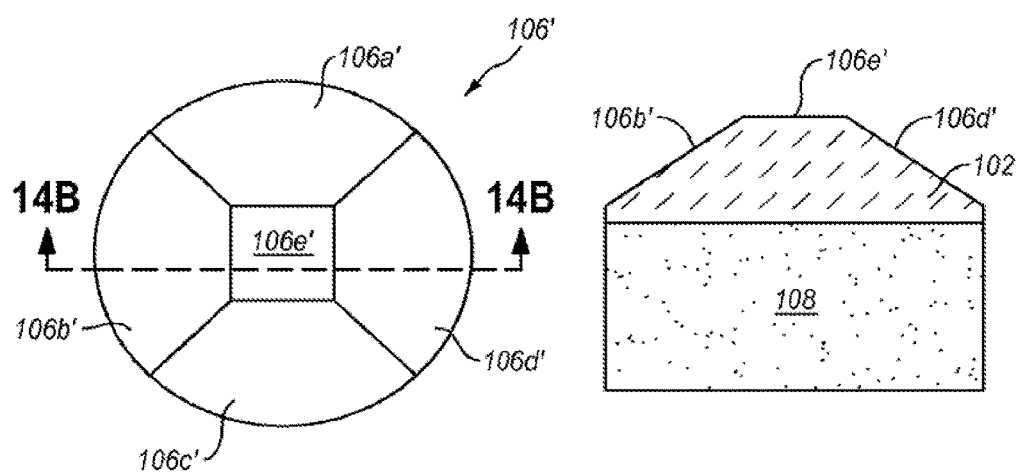
*Fig. 14A*  *Fig. 14B*

METHOD FOR LASER CUTTING POLYCRYSTALLINE DIAMOND STRUCTURES

CROSS-REFERENCE TO RELATED APPLICATIONS

This application is a continuation of application Ser. No. 13/166,007 filed on 22 Jun. 2011, which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented carbide substrate. A number of such cartridges may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst. Once the PCD table is formed, the solvent catalyst may be at least partially removed from the PCD table of the PDC by acid leaching.

It is often desirable to machine the PCD table, for example by forming a chamfer into the PCD table or to cut the PDC to provide a non-cylindrical shape. Such cutting has typically been accomplished by electrical-discharge machining, grinding, lapping or combinations thereof to remove desired portions of the PCD table and substrate. Despite the availability of such methods, manufacturers and users of PDCs continue to seek improved PDC manufacturing methods.

SUMMARY

Embodiments of the invention relate to methods of laser cutting PCD structures, such as PCD tables and PDCs. In many of the disclosed embodiments, a PCD table is provided. Such a PCD table may be separate from or bonded to a substrate as part of a PDC. In an embodiment of a method of shaping a PCD, laser energy is applied to an exterior surface of the PCD table to remove diamond material adjacent to the exterior surface so as to form a generally V-shaped groove into the PCD table. The V-shaped groove may comprise a scribe line or curve along which the PCD table may then be broken. Such laser scribing may be used to form a non-cylindrical PCD table or PDC from a cylindrical PCD table or PDC, for example, by electrical-discharge machining ("EDM") wire cutting or otherwise cutting (e.g., grinding) through the remainder of the diamond and/or substrate material generally along the scribe line or groove to form a non-cylindrical PCD table having an oval, square, rectangular, or other shaped profile. In another embodiment, the PCD or PDC may be broken generally along the scribe line. Although it is possible to form non-cylindrical PCD tables and PDCs through HPHT processes, such processes are more complex and expensive, often requiring additional steps to ensure the integrity of the non-cylindrical diamond table or PDC. Of course, in other embodiments, a generally cylindrical PCD table may also be formed by such a process (e.g., by removing a peripheral edge of an initial larger PCD table).

In some embodiments, laser energy is applied to an exterior surface of a provided PCD table in a series of passes of the laser so that the diamond material is removed to a first depth in a first pass and at least one subsequent pass thereafter removes diamond material adjacent to and at a depth greater than the diamond material removed in the immediately previous pass of the laser. Such progressive formation of the laser cut in the PCD table prevents or minimizes any thermal damage to the PCD table as the depth of material removed in each pass is sufficiently low so as to substantially prevent overheating or damage to adjacent diamond material. For example, such progressive cutting can prevent or minimize back conversion of diamond to graphite or amorphous carbon that may otherwise result where heat from the laser cutting is absorbed too rapidly into adjacent diamond material. Multiple passes, particularly when separated by rest periods, allow the heat to better dissipate, resulting in an overall lower temperature rise within the material adjacent to that being laser cut. Although such methods may allow for very high quality while minimizing damage, in alternative embodiments, the diamond material may be cut to a desired depth in a single pass or cut.

In another embodiment, laser energy is applied to a peripheral portion of an exterior surface of a provided generally cylindrical PCD table to remove diamond material from the peripheral portion to form a PCD table having a selected geometry. In an embodiment, the provided generally cylindrical PCD table is bonded to a similarly sized and shaped generally cylindrical substrate to define a PDC having a selected geometry. The portions of the generally cylindrical substrate that are adjacent to the peripheral portion of the PCD table (i.e., that portion that is removed) may also be removed by any suitable technique (e.g., laser cutting, grinding, lapping, electrical-discharge machining, or combinations thereof) to result in a PDC having a selected geometry, such as a non-cylindrical or a generally cylindrical geometry. For example, this method may be used to form PCD tables and PDCs having oval, square, rectangular, or other shaped profile. Of course, this method may also be used to form a PCD table or a PDC that is generally cylindrical (e.g., from a larger initial PDC from which the periphery is removed).

In another embodiment, laser energy is applied to a peripheral portion of an exterior surface of a provided PCD table to laser cut a chamfer into the PCD table. Such laser cutting of the chamfer may be achieved without the need for slow and expensive diamond grinding equipment, and provides all the benefits of chamfering such as improved wear resistance and particularly resistance to chipping and breakage.

In another embodiment, laser energy may be applied to an exterior surface of a provided PCD table to laser lap the exterior working surface to a smooth finish. For example, such a process may be employed to remove protruding portions of the exterior surface, resulting in improved smoothness. In an embodiment, the exterior surface to be laser lapped may be mapped prior to laser lapping so that it is only necessary to apply the laser energy to topographically "high" portions needing to be reduced in profile to provide a smoother exterior surface. In one embodiment, the finished surface may be flat and smooth, while other embodiments may provide a smoothly curved (e.g., concave or convex) surface.

Of course, in some embodiments, a plurality of the described laser cutting processes may be combined together in laser cutting a provided PCD table or PDC.

Laser cutting may be used to produce non-planar surfaces. For example, applications for such non-planar shapes may include, but are not limited to, jewelry and tooling, such as shaped dies, shaped punches, roof bits, bearings, and traction devices.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 6 is a partial cross-sectional view of a PDC showing a laser cut chamfer formed therein according to an embodiment;

FIG. 6A is a partial cross-sectional close up view of a PDC showing how a laser cut chamfer may be formed according to one embodiment;

FIG. 6B is a partial cross-sectional close up view of a PDC showing how a laser cut chamfer may be formed according to an alternative embodiment;

FIG. 6C is a partial cross-sectional close up view of a PDC showing a laser cut chamfer that is disposed radially inwardly relative to the lateral surface of the PCD table;

FIGS. 8A and 8B show before and after cross-section elevation views by which an initially non-flat surface may be laser cut to result in a flat surface;

FIGS. 9A and 9B show before and after cross-section elevation views by which a flat surface may be laser cut to result in a non-flat, convex surface;

FIGS. 10A and 10B show before and after cross-section elevation views by which a flat surface may be laser cut to result in a non-flat, concave surface;

FIGS. 12A and 12B show a top plan view and an elevation view, respectively, of a laser cut surface that may include multiple recesses or pockets;

FIGS. 13A and 13B show a top plan view and an elevation view, respectively, of a laser cut surface that may include multiple protrusions;

FIGS. 14A and 14B show a top plan view and a cross-sectional view, respectively, of a laser cut surface including multiple facets;

DETAILED DESCRIPTION

I. Introduction

Embodiments of the invention relate to methods of laser cutting PCD structures, such as PCD tables and PDCs. Laser cutting of the PCD tables and PDCs provides an alternative to EDM, grinding with a diamond wheel, or lapping with a loose abrasive, such as diamond (e.g., loose dry diamond, wet diamond, or slurry diamond). Grinding or lapping with a diamond wheel is relatively slow and expensive, as diamond is used to remove a diamond material. EDM of the PCD table is sometimes impractical or even impossible, particularly when the amount of cobalt or other electrically conductive infiltrant or catalyst within the PCD table is very low (e.g., in the case of a leached PCD table). As such, laser cutting provides a valuable alternative machining method that can be employed in various processes.

As used herein, the term "laser cutting" or variants thereof encompasses laser ablation, laser scribing, and laser lapping. In addition, "laser scribing" and variants thereof is a subset of laser ablation.

As used herein, the term "laser ablation" or variants thereof refers to a process in which laser energy is applied to a given surface (e.g., of a diamond material) to evaporate or vaporize a kerf into the surface. The kerf may extend partially or fully through a thickness of the diamond material.

As used herein, the term "laser scribing" or variants thereof refers to a process in which laser energy is applied to a given surface (e.g., of a diamond material) to ablate a kerf partially through the surface, leaving a connecting portion uncut. The structure may then be broken along the laser scribed scribe line or curve.

As used herein, the term "laser lapping" or variants thereof refers to a process in which laser energy is applied to protrusions extending from a given surface (e.g., of a diamond material) to evaporate or vaporize the protruding portions, resulting in a surface with greater smoothness than prior to laser lapping.

II. Polycrystalline Diamond Tables and Compacts

Figure 1A:
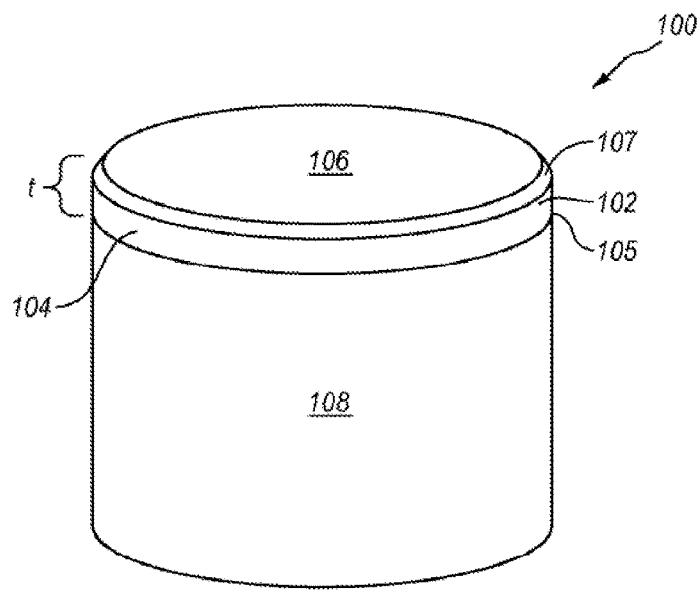
FIG. 1A is an isometric view of an embodiment of a PDC including a PCD table attached to a cemented carbide substrate.
Figure 1B:
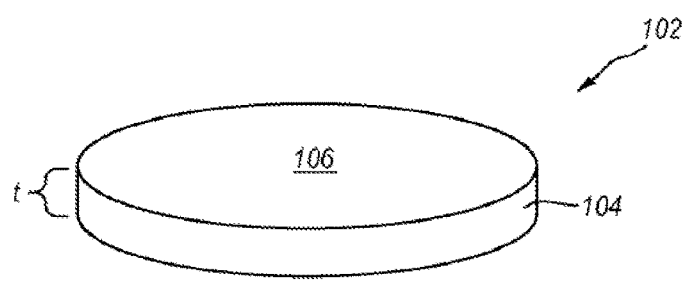
FIG. 1B is an isometric view of a PCD table similar to that shown in FIG. 1A, but not attached to a cemented carbide substrate.

FIG. 1A is an isometric view of an embodiment of a PDC 100 including a PCD table 102 attached to a cemented carbide substrate 108 along an interfacial surface 105 thereof. FIG. 1B shows a PCD table 102 that may otherwise be similar to table 102 of FIG. 1A, but which is unattached to any substrate. In either case, the PCD table 102 includes a plurality of directly bonded-together diamond grains exhibiting diamond-to-diamond bonding (e.g., sp$^3$ bonding) therebetween. The PCD table 102 includes at least one lateral surface 104, an upper exterior working surface 106, and an optional chamfer 107 extending therebetween. It is noted that at least a portion of the at least one lateral surface 104 and/or the chamfer 107 may also function as a working surface that contacts a subterranean formation during drilling operations.

The bonded together diamond grains of the PCD table 102 may exhibit an average grain size of about 100 μm or less, about 40 μm or less, such as about 30 μm or less, about 25 μm or less, or about 20 μm or less. For example, the average grain size of the diamond grains may be about 10 μm to about 18 μm, about 8 μm to about 15 μm, about 9 μm to about 12 μm, or about 15 μm to about 25 μm. In some embodiments, the average grain size of the diamond grains may be about 10 μm or less, such as about 2 μm to about 5 μm or submicron.

The diamond particle size distribution of the diamond particle may exhibit a single mode, or may be a bimodal or greater grain size distribution. In an embodiment, the diamond particles of the one or more layers of diamond particles may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger average particle size (e.g., 50 μm, 40 μm, 30 μm, 20 μm, 15 μm, 12 μm, 10 μm, 8 μm) and another portion exhibiting at least one relatively smaller average particle size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger average particle size between about 10 μm and about 40 μm and another portion exhibiting a relatively smaller average particle size between about 1 μm and 4 μm. In some embodiments, the diamond particles may comprise three or more different average particle sizes (e.g., one relatively larger average particle size and two or more relatively smaller average particle sizes), without limitation.

It is noted that the as-sintered diamond grain size may differ from the average particle size of the diamond particles prior to sintering due to a variety of different reasons, such as grain growth, diamond particles fracturing, carbon provided from another carbon source (e.g., dissolved carbon in the metal-solvent catalyst), or combinations of the foregoing.

The PCD table 102 may exhibit a thickness "t" of at least about 0.040 inch, such as about 0.045 inch to about 1 inch, about 0.045 inch to about 0.500 inch, about 0.050 inch to about 0.200 inch, about 0.065 inch to about 0.100 inch, or about 0.070 inch to about 0.100 inch (e.g., about 0.09 inch). The PCD table 102 may or may not include a catalyst or infiltrant disposed in at least a portion of the interstitial regions between the bonded diamond grains of the PCD table 102. The infiltrant may include, but is not limited to, iron, nickel, cobalt, and alloys of the foregoing metals. For example, the infiltrant may be provided from the substrate 108 (e.g., cobalt from a cobalt-cemented carbide substrate). In embodiments in which a region of the PCD table 102 includes substantially no catalyst or infiltrant (e.g., less than about 2% by weight, or no more than about 1% by weight), the catalyst or infiltrant may have been removed by leaching, for example, by immersing the PCD table 102 in an acid, such as aqua regia, nitric acid, hydrofluoric acid, mixtures thereof, or other suitable acid. For example, leaching the PCD table 102 may form a leached region that extends inwardly from the exterior surface 106, the lateral surface 104, and the chamfer 107 to a selected leached depth. The selected leached depth may be about 100 µm to about 1000 µm, about 100 µm to about 300 µm, about 300 µm to about 425 µm, about 350 µm to about 400 µm, about 350 µm to about 375 µm, about 375 µm to about 400 µm, about 500 µm to about 650 µm, or about 650 µm to about 800 µm.

Valuable metals (e.g., cobalt, nickel, etc.) may be recovered following acid leaching by carbon monoxide extraction, for example, as disclosed in U.S. Pat. No. 4,322,390, herein incorporated by reference.

Figure 1C:
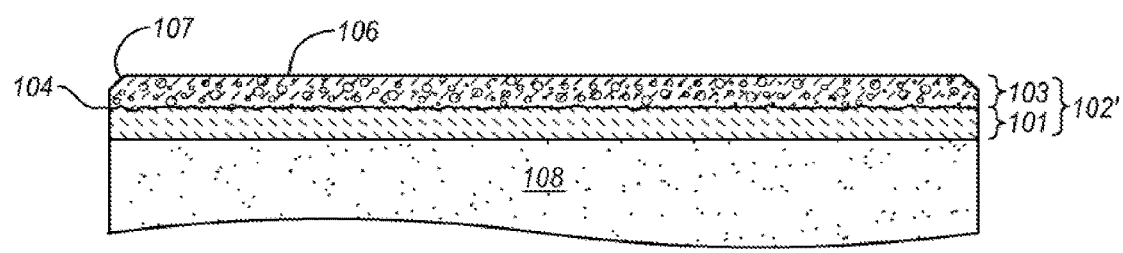
FIG. 1C is a partial cross-sectional view of a PDC including a PCD table with a leached exterior region.

FIG. 1C shows a cross-sectional view through an exemplary PCD table 102' which has been leached to include a leached region 103 adjacent to exterior surface 106 and extending inwardly therefrom to region 101, within which the concentration of catalyst or infiltrant has not been significantly reduced as a result of leaching. It will be understood that use of a laser for removal of material of the diamond table (or underlying substrate 108) may be carried out on leached or un-leached PCD diamond tables. The ability to laser cut a leached diamond table, which may include no or a very low concentration of electrically conductive catalyst or infiltrant material is particularly advantageous. For example, EDM cutting of leached diamond table structures can prove difficult and can sometimes be a practical impossibility because of insufficient electrical conductivity within the diamond table to be cut. Laser cutting offers an alternative that does not require a minimum threshold level of electrical conductivity within the part in order to allow cutting of the part.

U.S. Pat. No. 7,866,418, herein incorporated by reference, discloses PCD tables and associated PCD compacts formed under conditions in which enhanced diamond-to-diamond bonding occurs. Such enhanced diamond-to-diamond bonding is believed to occur as a result of the sintering pressure (e.g., at least about 7.5 GPa) employed during the HPHT process being further into the diamond stable region, away from the graphite-diamond equilibrium line. The PCD tables and compacts disclosed therein, as well as methods of fabrication are suitable for laser cutting according to the methods disclosed herein. Generally, as the sintering pressure is increased above 7.5 GPa, a wear resistance of the PCD so-formed may increase. For example, the $G_{ratio}$ may be at least about $4.0 \times 10^6$, such as about $5.0 \times 10^6$ to about $15.0 \times 10^6$ or, more particularly, about $8.0 \times 10^6$ to about $15.0 \times 10^6$. In some embodiments, the $G_{ratio}$ may be at least about $30.0 \times 10^6$. The $G_{ratio}$ is the ratio of the volume of workpiece cut to the volume of PCD worn away during the cutting process. An example of suitable parameters that may be used to determine a $G_{ratio}$ of the PCD are a depth of cut for the PCD cutting element of about 0.254 mm, a back rake angle for the PCD cutting element of about 20 degrees, an in-feed for the PCD cutting element of about 6.35 mm/rev, a rotary speed of the workpiece to be cut of about 101 RPM, and the workpiece may be made from Barre granite having a 914 mm outer diameter and a 254 mm inner diameter. During the $G_{ratio}$ test, the workpiece is cooled with a coolant, such as water.

The substrate 108 may comprise a plurality of tungsten carbide or other carbide grains (e.g., tantalum carbide, vanadium carbide, niobium carbide, chromium carbide, and/or titanium carbide) cemented together with a metallic cementing constituent, such as cobalt, iron, nickel, or alloys thereof. For example, in an embodiment, the cemented carbide substrate is a cobalt-cemented tungsten carbide substrate. In some embodiments, the substrate 108 may include two or more different carbides (e.g., tungsten carbide and chromium carbide).

The PCD table 102 may be formed separately from or integral with the substrate 108 in an HPHT process. When formed separately, the PCD table 102 may be subsequently attached to the substrate 108 in another HPHT process. The temperature of such HPHT process may typically be at least about 1000° C. (e.g., about 1200° C. to about 1600° C.) and the pressure of the HPHT process may typically be at least about 4.0 GPa (e.g., about 5.0 GPa to about 12.0 GPa, about 7.0 GPa to about 9.0 GPa, about 6.0 GPa to about 8.0 GPa, or about 9.0 GPa to about 12.0 GPa).

III. Laser Cutting Methods

Figure 2A:
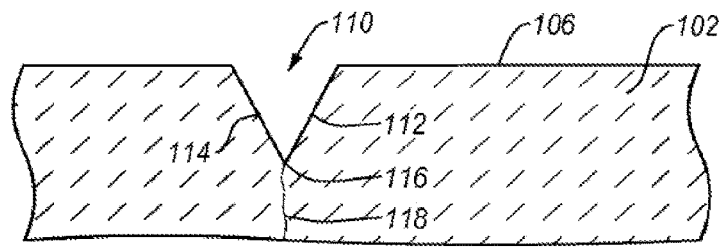
FIG. 2A is a partial cross-sectional view of a PCD table including a laser cut generally V-shaped groove cut therein.

FIG. 2A shows the PCD table 102 includes a groove 110 (e.g., generally V-shaped) that has been cut with a laser according to an embodiment. PCD table 102 may comprise a leached portion of a PCD diamond table as described in conjunction with FIG. 1C. As shown, the groove 110 may extend only partially through PCD table 102 to form a scribe line along which the PCD table 102 may be broken. In an embodiment, rather than cutting the full depth of the groove 110 in a single trajectory, the method employs multiple passes to cut progressively deeper with each pass until the laser cuts to the desired depth, or entirely through the structure. In an embodiment, the majority (e.g., substantially all) of any slag resulting from the laser cutting is also removed by the laser (e.g., by ablation) from the side walls 112 and 114 of the groove 110 as the groove 110 is progressively deepened. Slag removal is one benefit of forming groove 110 with multiple passes rather than a single cut.

As shown in FIG. 2A, the laser may be used to cut tapered sidewalls 112 and 114 so as to form a groove 110. In an embodiment, the PCD table 102 is subsequently broken along groove 110. For example, breaking of the PCD table 102 may occur along line 118 that emanates generally from lowermost region 116 (e.g., a vertex or cusp) of the groove 110. Formation of the groove 110 is advantageous as the laser-cut groove or scribe line 110 may terminate in a substantial point as viewed in transverse cross-section (or a line as viewed in plan view), providing a fracture point or line along which the PCD table 102 may be broken.

Scribing and breaking of a PCD table or PDC may be useful for fracture toughness testing and/or cross-sectional analysis. Scribing and breaking could also be used in forming a smaller PCD table or PDC (e.g., non-cylindrical in shape), although preferably excess portions would be cut or ground away (e.g., through laser cutting, EDM, or grinding) as described in greater detail below in conjunction with FIGS. 3A-5 in order to produce a smaller (and perhaps non-cylindrical in shape) PCD table or PDC.

The V-shaped groove 110 is wider at its top, adjacent exterior top surface 106, and narrows towards lower most region 116. In general terms, V-shaped grooves may include various other shapes that do not terminate in a vertex as shown. For example, the groove may alternatively be U-shaped, including a radius of curvature adjacent lower most region 116. Alternatively, the groove 110 may be flat-bottomed as shown in FIG. 2C. Such alternatives, as well as others that will be apparent to one of skill in the art, are encompassed within the term groove as used herein.

Fracture point or line 118 emanating from region 116 may be most advantageous as compared to a other groove shapes (e.g. a laser cut that does not terminate in a vertex), as it would be difficult to guide fracture of the PCD table 102 along a desired fracture line. For example, if the sidewalls 112 and 114 were not tapered so as to terminate in the vertex 116, but were substantially parallel to one another so that the "bottom" of the laser cut included a floor with some width defined between the sidewalls 112 and 114, fracture of the floor could occur at any point along the floor between sidewalls 112 and 114.

Providing a vertex so that the "bottom" of the cut terminates in a point with substantially zero width rather than a floor having some given width forces fracture to occur along the line 118. The particular angles of the sidewalls 112 and 114 may depend on the particular power and focus characteristics selected during operation of the laser. For example, higher power produces less taper, and greater focus of the laser will also produce less taper. Similarly, lower power produces greater taper, while lower or "softer" focus also produces greater taper.

In another embodiment, the method is directed to a method of progressively cutting into or through the PCD table 102 in multiple passes of the laser. Such a method of progressively deeper cutting may be performed in conjunction with cutting of a V-shaped groove as described above and shown in FIG. 2A, or alternatively such laser cutting may form another shaped laser cut (e.g., one bounded by substantially parallel sidewalls, or one bounded by outwardly tapered sidewalls rather than inwardly tapered sidewalls as shown in FIG. 2A.

Figure 2B:
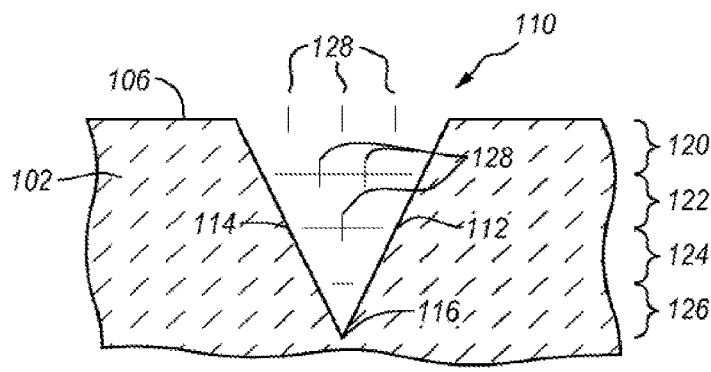
FIG. 2B is a partial cross-sectional view of a PCD table showing how the laser cut may be formed progressively wider and progressively deeper with a plurality of passes of the laser according to an embodiment.
Figure 2C:
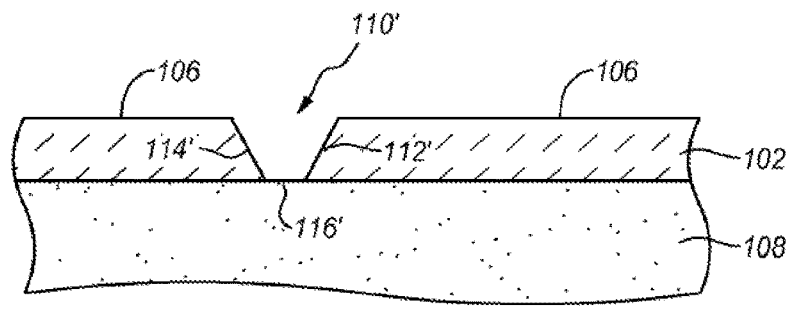
FIG. 2C is a partial cross-sectional view of a PDC in which a laser cut has been formed through the PCD table portion of the PDC, leaving the substrate of the PDC intact, according to an embodiment.

FIG. 2B schematically illustrates how a V-shaped groove similar to that shown in FIG. 2A may be formed by multiple passes of the laser to cut progressively wider and progressively deeper into the PCD table 102 according to an embodiment. The groove 110 may be formed progressively through multiple stages (e.g., a first stage 120 having a greatest width, a second stage 122 having an intermediate width, a third stage 124 having an intermediate width narrower than stage 122, and a fourth stage 126 having a narrowest width. For example, the first stage 120 may be formed by applying laser energy in one or more first stage passes to the exterior surface 106 of the PCD table 102 to ablate diamond material adjacent to the exterior surface 106 and within the first stage 120.

When forming the V-shaped groove 110, the first stage 120 will have the greatest width. The taper of the sidewalls may be achieved by selecting appropriate power and focus settings of the laser when cutting kerfs adjacent to sidewalls 112 and 114. Lower power, a less (e.g., softer) focused, more diffuse beam of laser energy, or combinations thereof may be used to increase the angle of the taper. Depending on the desired depth of the final cut groove 110, and the characteristics of the particular laser employed, more than one pass of the laser may be required to complete cutting of the first stage 120. For example, if the kerf width provided by the laser is of a width as shown by hash marks 128, four passes of the laser would be required to ablate diamond material to a depth represented by the first stage 120. Once the diamond material within the first stage 120 has been ablated, cutting may begin on the second stage 122, which requires fewer passes of the laser (e.g., 3 kerf widths wide), as the sidewalls 112, 114 are tapered. Similarly, once the diamond material from the second stage 122 has been ablated, cutting may begin on third stage 124, which requires fewer passes of the laser as compared to the previous stage (e.g., 2 kerf widths wide). The final stage may be only a single kerf width wide, and may terminate in a substantial vertex, if desired.

Employing multiple passes of the laser to form groove 110 is helpful in avoiding thermally induced damage to the PCD material of region 102, as well as when laser cutting through substrate 108. The inventor has observed that thermally induced damage may be more likely to occur when laser cutting the substrate 108 than PCD region 102. As such, the width and depth associated with cutting in substrate 108 may be smaller than when cutting within PCD material 102 so as to minimize or prevent any thermal damage to the PCD table 102 or substrate 108.

In some embodiments, the groove 110 is not to be used as a scribe line along which the PCD table 102 is broken, and the groove or cut 110 may not terminate in a substantial vertex, but may exhibit a "floor" 116' having a given width between sidewalls 112 and 114 (e.g., as seen in FIG. 2C). In one embodiment, a laser-cut groove 110 may be formed on one side of the PCD table or PDC, while an aligned cut may be formed on the opposite "bottom" side (e.g., by laser cutting or EDM) to complete the cut. Such an embodiment may be particularly helpful for laser cutting through a low conductivity (e.g., leached) diamond PCD table, while EDM may be used to cut through the opposite surface. The opposite surface may be tungsten carbide substrate and/or higher conductivity (substantially un-leached) diamond.

The angles of the sidewalls 112 and 114 are determined, at least in part, based on the power, focus, and other beam quality characteristics selected during operation of the laser. It may be advantageous to refocus the laser periodically, for example after between about 0.001 inch and about 0.15 inch (e.g., about 0.001 inch and about 0.01 inch) of diamond material has been ablated or removed from the cut. In an embodiment, refocusing may occur between about 0.003 inch to about 0.05 inch (e.g., about 0.003 inch to about 0.007 inch) of diamond material removed from the cut. In another embodiment, refocusing may occur between about 0.004 inch and about 0.006 inch (e.g., about 0.005 inch) of diamond material removed from the cut. In one embodiment, one stage may be as deep as about 0.15 inch, depending on the power of the laser and the diamond material being cut. In addition, the power and focus characteristics employed when cutting adjacent to the sidewalls 112 and 114 may differ from the power and focus settings when cutting kerfs within the central portion of the cut.

The number of stages associated with any particular cut may depend on the total depth desired. For example, where the total depth is relatively shallower, relatively fewer stages may be required, and where the total depth is deeper, more stages may be required. For example, where a total depth of cut is intended to be only about 0.003 inch (e.g., a shallow scribe line), perhaps only one stage may be required. Where a total depth of about 0.1 inch is desired, many more stages may be required, and it may be advantageous to provide a rest period between cuts so as to allow heat to better dissipate from the PCD table 102. Where rest periods are provided, the period of rest may be between about 0.2 times and about 3 times that of the active cut time, more preferably between about 0.5 times and about 2 times that of the active cut time, and even more preferably about equal to the active cut time.

Laser cuts of any desired depth may be formed according to the disclosed embodiments of methods. Often, the depth of cut desired may depend on the purpose for the cut. Where the cut is formed as a scribe line as shown in FIG. 2A along which the PCD table 102 may be broken, a depth of as little as about 0.003 inch may be sufficient, particularly where the PCD table 102 may have a total thickness between about 0.04 inch and about 0.1 inch. Where the purpose of the cut is to entirely remove a peripheral portion of the PCD table 102 of a PDC, significantly greater depth, up to the full thickness of the PCD table (e.g., about 0.1 inch) may be desired.

FIG. 2C shows the PCD table 102 attached to the substrate 108 in which a laser cut portion 110' has been formed through the PCD table 102, leaving the substrate 108 substantially intact, according to an embodiment. Of course, it may be possible to cut through the carbide substrate 108 with the laser, although alternative cutting methods for cutting the carbide substrate are also contemplated by the present disclosure. PCD products can be processed from an as-pressed condition as provided from the HPHT process to a finished diameter or dimensions much more efficiently and with substantially lower cost by first removing desired portions of the PCD table with laser ablation and/or laser scribing. These processes may be followed by final grinding, where relatively small residual portions of the diamond material may require removal, although the vast majority of diamond material to be removed is removed through laser cutting, leaving relatively little, if any, to be removed by a grinding or EDM process.

For example, the portion 110' of the PCD table 102 may be removed by laser cutting. The portion 110' is bounded by sidewalls 112' and 114' as well as a floor 116' having a width defined between sidewalls 112' and 114'. Attempting to remove the portion 110' by EDM includes attendant risks, as interaction of EDM and residual stresses within the PCD table 102 can result in cracking in the PCD table 102 and/or the substrate 108. To minimize or eliminate this problem, a laser trough/groove or portion 110' may be formed (e.g., with multiple passes of the laser to achieve both the desired width and depth) in the PCD table 102, or even the substrate 108. Gradual removal of the diamond material from the top, exterior surface 106 (or alternatively from another exterior surface such as the side or the bottom of a PCD table that is unattached to a substrate) of the PCD table 102 has been found to relieve stress in the part more uniformly. As such, laser cutting can reduce the risk of breakage as compared to EDM machining.

For example, when the PCD table 102 is cut with EDM, and the EDM wire is normal to the exterior surface 106, a stress gradient is formed at the leading edge of the cut. EDM through the PCD table 102 is believed to concentrate the stress at the leading edge of the cut, which may result in cracking of the diamond table and/or substrate.

Thus, once the portion 110' has been formed through the PCD table 102 by laser cutting, the stresses are at least partially relieved, and EDM may be more reliably used for cutting through the substrate 108.

Figure 2D:
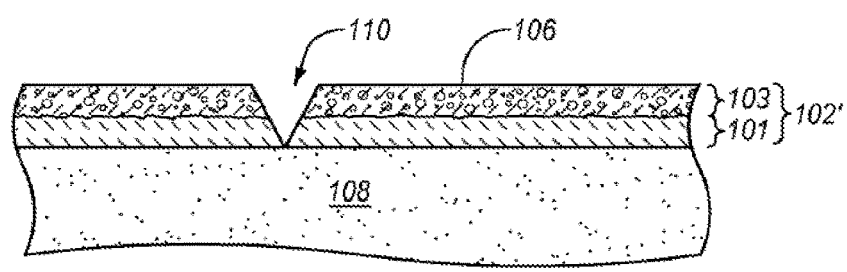
FIG. 2D is a partial cross-sectional view of a PDC including a PCD table with a leached exterior region similar to that of FIG. 1C in which a laser cut has been formed through the PCD table portion of the PDC, leaving the substrate of the PDC intact, according to an embodiment.

FIG. 2D illustrates laser cutting of a groove 110 into a PCD table 102' that specifically includes a leached region or layer 103 and an adjacent substantially un-leached region of layer 101 between leached layer and substrate 108. Groove 110 is formed through leached region 103, and may extend into substantially un-leached region 101. Although not shown, groove 110 may also extend through un-leached region 101 and into substrate 108. As a practical matter, such a groove formed into leached region 103 may be difficult or impossible to form by wire EDM, as the leached region 103 exhibits insufficient electrical conductivity to be cut by EDM. Thus, laser cutting provides a distinct advantage, as it allows cutting of such diamond table surfaces that exhibit relatively low electrical conductivity. Further cutting through substrate 108 may be achieved by EDM or laser cutting, as desired.

Laser cutting into electrically low conductivity region 103 and optionally into higher conductivity region 101 is also believed to reduce stresses within regions 103 and 101, reducing risk of cracking during any subsequent EDM operation. Such a laser cut may be shaped as shown in FIG. 2C to include a "floor" and be made wide enough to accommodate an EDM wire. The desired width and depth may be achieved through multiple passes of the laser.

Figure 3A:
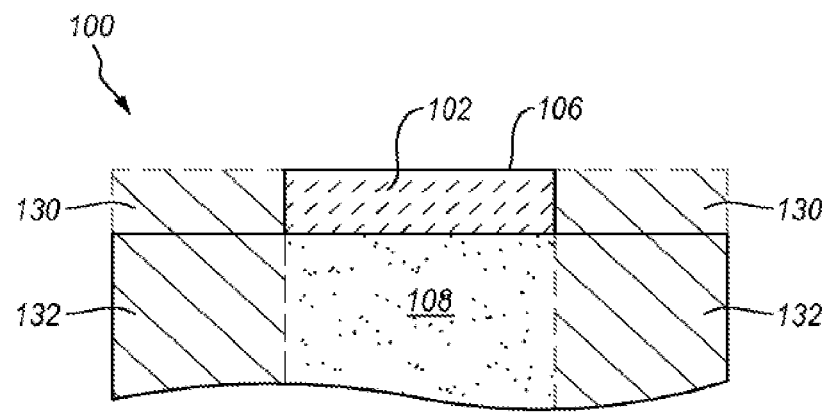
FIG. 3A is a cross-sectional schematic view of a generally cylindrical PDC in which a peripheral portion of the PCD table of the PDC is to be removed by laser cutting and adjacent portions of the substrate are also to be removed according to an embodiment.

FIG. 3A illustrates a method of laser cutting a PDC according to another embodiment. As shown in FIG. 3A, a generally cylindrical PDC 100 (e.g., such as that shown in FIG. 1A) is provided, and laser energy is applied to a peripheral portion 130 of the PCD table 102 to ablate diamond material within the peripheral portion 130. Corresponding peripheral portions 132 of the substrate 108 may also be removed (as described in greater detail below) so as to result in a PDC of a different shape than initial PDC 100. Removal of peripheral portions 132 may be through laser cutting, or by other suitable methods (e.g., EDM, CG, etc.). For example, a PDC formed according to such a method may be non-cylindrical in profile (e.g., square, rectangular, oval, etc. in profile) or generally cylindrical in profile, as desired.

Figure 3B:
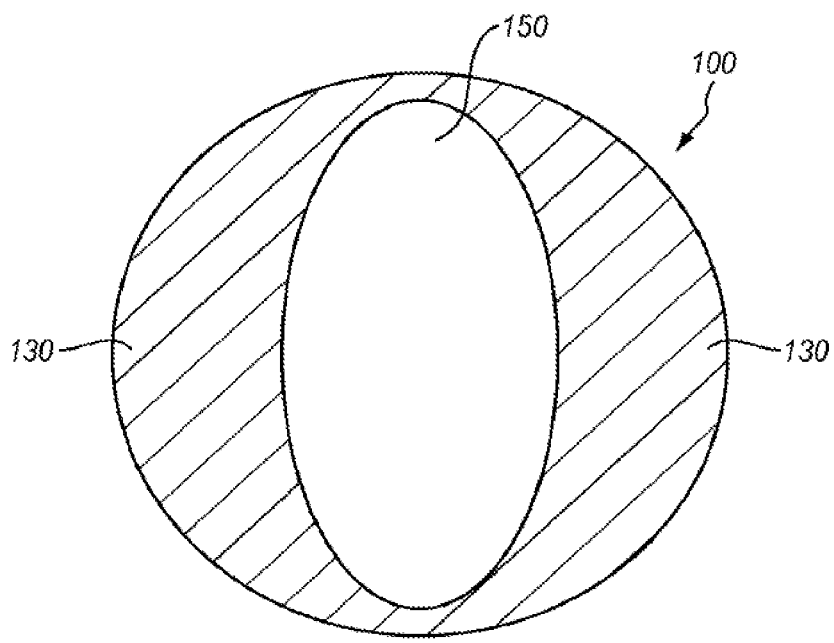
FIG. 3B is top plan view of the cylindrical PDC of FIG. 3A showing peripheral regions to be removed to form an oval PDC.
Figure 4A:
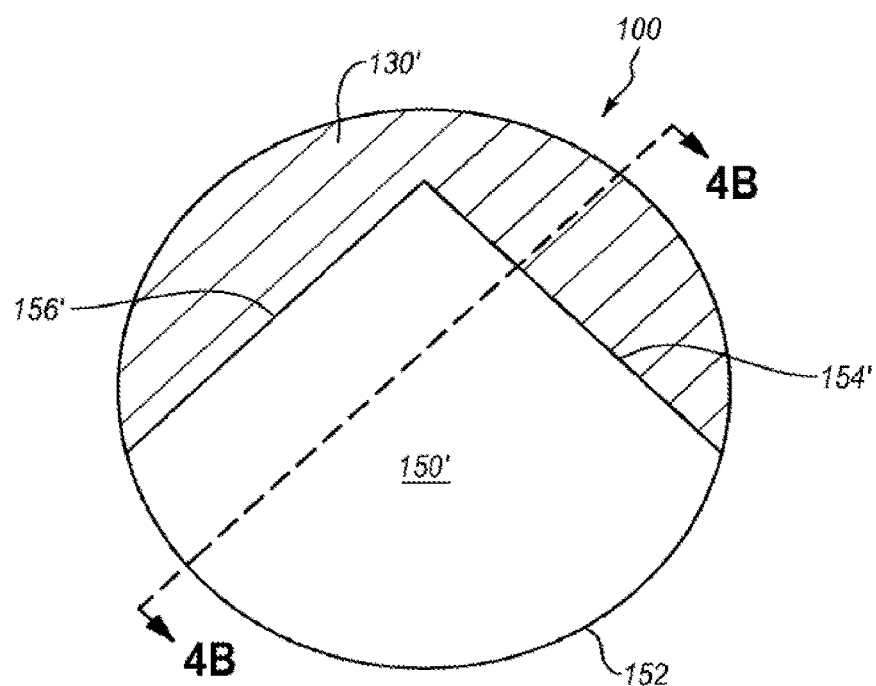
FIG. 4A is a top plan view of a generally cylindrical PDC and in which peripheral portions of the PCD table of the PDC are to be removed by laser cutting according to an embodiment.
Figure 4B:
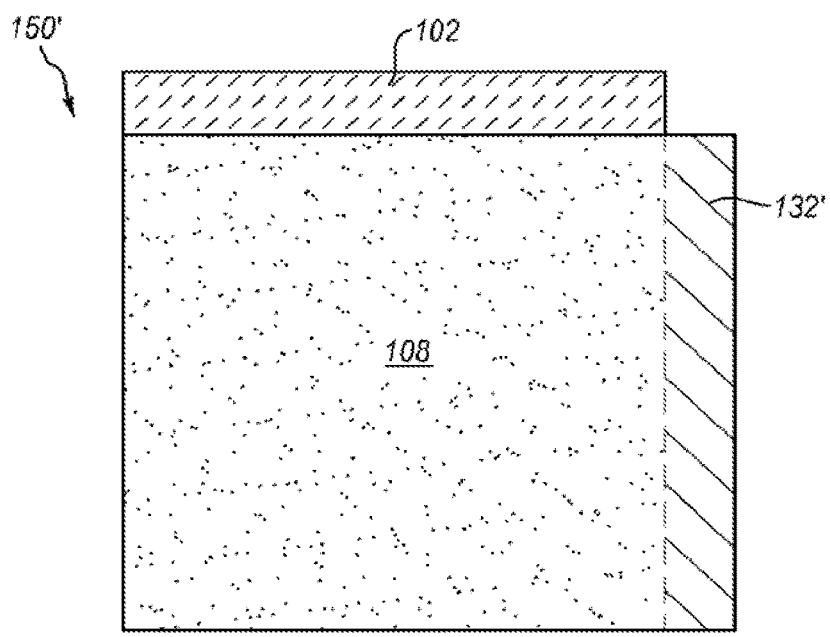
FIG. 4B is a cross-sectional view of the PDC of FIG. 4A once the selected peripheral portions of the PCD table are removed by laser cutting.

As shown in FIG. 3B, the top plan view and cross-section of the finished PDC 150 may be oval in profile and cross-section once peripheral portions 130 of PDC 100 and corresponding portions of substrate 108 are removed. Non-standard, irregular shapes may also be possible. For example, FIGS. 4A and 4B show a top plan view and a cross-sectional side view, respectively of a PDC 150' that is generally pie shaped in top view profile and cross-section according to another embodiment. PDC 150' is bounded by a curved edge 152 defined by the radius of a portion of PDC 100 and also straight edges 154' and 156'. The shape illustrated in FIG. 4A results once peripheral portion 130' of the PCD table of PDC 100 is removed by laser cutting and corresponding portions of the underlying substrate (shown in FIG. 4B as 132') are also removed. FIG. 4B shows a cross-sectional view in an intermediate state once the peripheral portion 130' has been removed, but the corresponding peripheral portion 132' of substrate 108 has not yet been removed.

Figure 5:
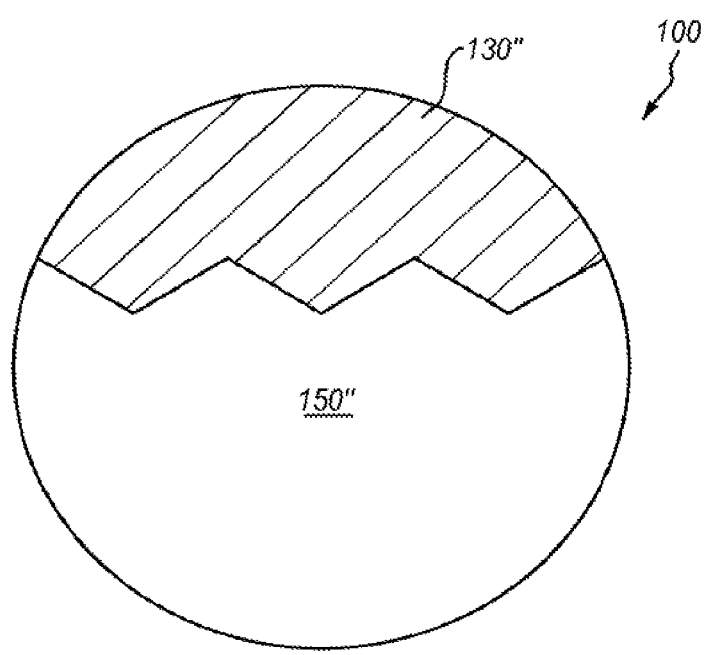
FIG. 5 is a top plan view of another generally cylindrical PDC showing another shape for a PDC formed by removing a selected peripheral portion of the cylindrical PDC according to an embodiment.

FIG. 5 shows a top plan view of another embodiment of an irregular shape PDC 150" that may be formed from a generally cylindrical PDC 100 by laser cutting away PDC table peripheral portion 130" and also removing the corresponding peripheral portion of the substrate 108 underlying peripheral portion 130" of the PCD table. Although the illustrated shapes show removal of a peripheral portion of the diamond table, it will be understood that in another embodiment, it may be possible to remove a centrally disposed portion, rather than just a peripheral portion (e.g., so as to result in a donut shaped PDC).

Removal of the underlying peripheral portion of the substrate 108 that corresponds to the laser removed portion of the PCD table 102 may be accomplished by any desired technique. For example, it may also be removed by laser cutting, or it may alternatively and/or additionally be removed by EDM, grinding, lapping, combinations thereof, or another suitable technique. Where removal may be by EDM and the removal requires the EDM wire to have a pathway from the exterior edge to an interior cutting path, the laser may be used to laser cut a pathway from the exterior edge of the part to the interior path. Although the substrate 108 may comprise a very hard material (e.g., tungsten carbide), it is significantly less hard than the PCD table 102, so that removal by mechanical techniques are much faster and less expensive than use of mechanical techniques to remove diamond material. Exemplary CNC grinding techniques are disclosed in U.S. patent application Ser. No. 12/558,939 filed Sep. 14, 2009, which is incorporated herein by reference in its entirety.

Although the above description generally describes laser cutting of "top" exterior surface 106 of PCD table 102, it will be understood that laser cutting may also be performed on peripheral surface 104 of PCD table 102 (e.g., cutting grooves into the side of table 102), or into peripheral surface or bottom substrate of 108.

FIG. 6 illustrates a PDC 100 in which laser energy has been applied to a peripheral portion of PCD table 102 extending between exterior "top" working surface 106 and lateral "side" surface 104 so as to remove a triangular region 109 seen in the cross-sectional view of FIG. 6, resulting in a laser-cut chamfer surface 107, according to an embodiment. The laser energy applied to form chamber surface 107 may be applied from a direction that is radially inward relative to peripheral edge 104, above top exterior surface 106. Alternatively, the laser energy may be applied from a direction that is radially outward relative to peripheral edge, where the laser source is positioned below surface 106. In addition, a chamfer may be formed within table 102 that is not adjacent to peripheral edge 104, but is located radially inwardly from peripheral edge 104 (e.g., similar to groove 110' of FIG. 2C).

The laser-cut chamfer 107 may prevent or minimize any tendency for the surface 106 and/or 104 to chip or break at their intersection, as a result of the shallower angle formed therebetween. Formation of the chamfer 107 by laser cutting, rather than by grinding or by EDM is advantageous, as EDM can result in stress fractures within the PCD table 102 as described above, and grinding the PCD table 102 with a diamond wheel in order to form a chamfer is slow and expensive, because diamond is being used to grind away diamond, and no harder material for the diamond wheel is known. Thus, methods of laser cutting the chamfer 107 may be less expensive, may be achieved more quickly, and may result in less waste (i.e., as product is damaged during EDM chamfering). The chamfer 107 may be smooth or have another shape formed by laser cutting, such as being serrated.

In any of the above described laser cutting techniques, the entire portion of the PCD table 102 removed to form the chamfer 107 may be ablated away by the laser. FIG. 6A illustrates such an embodiment. For example, when laser cutting a chamfer into the PCD table 102, the kerf of the one or more passes of the laser L may entirely ablate the triangular region 109. In another embodiment, a portion 109a of the PCD table may be ablated within the kerf of the laser L, while an adjacent portion 109b may simply become disconnected from the remainder of the PCD table 102. FIG. 6B shows such an alternative embodiment in which the kerf may simply cut through PCD table 102 at 109a along chamfer surface 107, leaving an un-ablated portion (triangular region 109b) that may be discarded or recycled.

In either embodiment, the chamfer may be formed on a surface of the PCD table 102 that is disposed radially inwardly relative to original lateral surface 104. For example, as shown in FIG. 6C, Groove 110 may be laser cut into PCD table 102, after which a chamfer 107 may be formed according to either of the techniques discussed above in conjunction with FIG. 6A or 6B. The peripheral portion of table 102 between original lateral surface 104 and groove 110 may be removed by any suitable method (e.g., laser cutting, EDM, grinding, breaking, etc.). In one embodiment, such a peripheral portion of table 102 may be removed by laser cutting (e.g., ablated) by rotating the PCD table or PDC while applying laser energy to the peripheral surface 104. Such a technique may employ multiple rotations of the PCD table or PDC, and the laser may be applied generally perpendicular to the rotational axis of the PCD table or PDC. The laser may also be moved longitudinally "up" and/or "down" parallel to the axis of rotation (e.g., the axis of rotation may be the longitudinal axis of the PCD table or PDC).

Figure 7A:
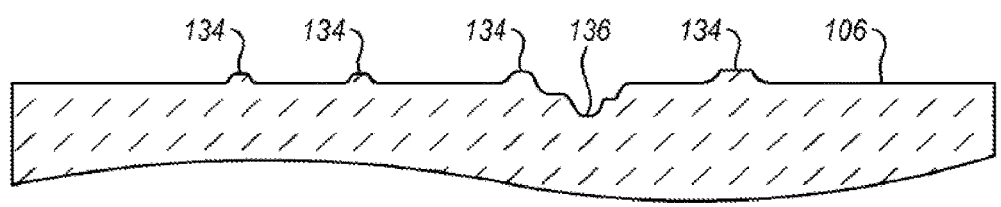
FIG. 7A is a close up cross-sectional view of an exterior surface of a PCD table including an initially rough surface with protrusions that can be smoothed by laser lapping.
Figure 7B:
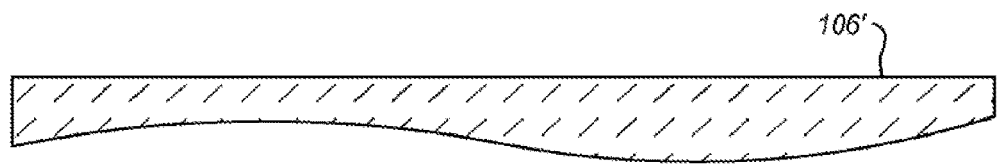
FIG. 7B is a close up cross-sectional view of the exterior surface of the PCD table of FIG. 7A after the protrusions have been removed by laser lapping according to an embodiment.

FIGS. 7A and 7B illustrate how laser cutting may be employed in lapping the exterior surface 106 of the PCD table 102 according to an embodiment. When the PCD table 102 is formed through an HPHT process, the exterior surface 106 may not be perfectly smooth, flat, or of the desired shape. For example, where a flat, smooth surface is desired the initial exterior surface 106 may include one or more protrusions 134 extending from and/or recesses 136 within the exterior surface 106. Polishing or lapping of the surface may sometimes be achieved by lapping the exterior surface 106 against another diamond exterior surface, e.g., by grinding or lapping. In addition to being relatively slow and expensive, such techniques include an attendant risk that one or more grains of diamond material may be pulled from exterior surface 106, destroying the part or at least requiring further grinding and/or polishing.

In an embodiment, laser cutting may be used to selectively remove protrusions such as protrusions 134 by applying laser energy to the protrusions 134 of the exterior surface 106 so as to remove (e.g., ablate) the diamond material of such protrusions. If any recesses (e.g., recess 136) are present, these may be removed by further lapping the entire exterior surface so as to bring it at least "down" to the bottom of the recess, as shown in FIG. 7B. This final leveling so as to remove any recesses may be accomplished by laser cutting away a depth of the entire exterior surface 106 (optionally including recess 136, e.g., up to or beyond recess 136) or by grinding or lapping against another diamond surface. Where grinding or lapping is employed, the risk of inadvertent removal of one or more grains of diamond material is reduced, as any protrusions 134 were previously removed by laser cutting. Laser removal of protrusions 134 further reduces the risk of propagation of micro-cracks within the diamond material.

In an embodiment, the laser cutting may apply laser energy across the exterior surface, so as to ablate any protrusions extending therefrom. In another embodiment, the exterior surface 106 may first be mapped (e.g., electronically, photographically, or by laser mapping) to identify the locations of the protrusions 134 (as well as any recesses 136), and then the protrusions 134 may be specifically targeted for removal by applied laser energy. In other words, the laser energy may not be applied over the entire exterior surface, but simply to those specific protruding areas 134 requiring removal. However, in some embodiments, laser cutting may be used to apply energy across the entire planarized surface 106'. For example, the substantially planarized exterior surface 106' may be formed via laser cutting to provide a desired PCD table thickness. As shown in FIG. 7B, a final substantially planarized exterior surface 106' (e.g., up to or beyond the recess 136 shown in FIG. 7A) formed as a result of the lasing process is smoother than the initial exterior surface 106.

In the embodiments discussed above for laser chamfering and laser planarizing, the PCD table may be freestanding (i.e., not attached to a substrate in substantially fully leached or un-leached form) or attached to the substrate (i.e., a PDC such as the PDC 100). For example, a freestanding PCD table may be laser chamfered, leached to at least partially remove a catalyst used in the formation thereof, and attached to a substrate 108 in a subsequent HPHT process and/or brazing process.

For some applications, the exterior surface 106 or 106' may be non-planar (e.g., jewelry or tooling such as punches, dies, roof bits, mining tools, road material removal tools, and/or traction devices). Such non-planar surfaces can be formed by the laser cutting methods disclosed herein. For example, laser cutting of the surface can even be used to form three-dimensional sculptures (e.g., of people or any object) for jewelry or other aesthetic products.

Figure 11C:
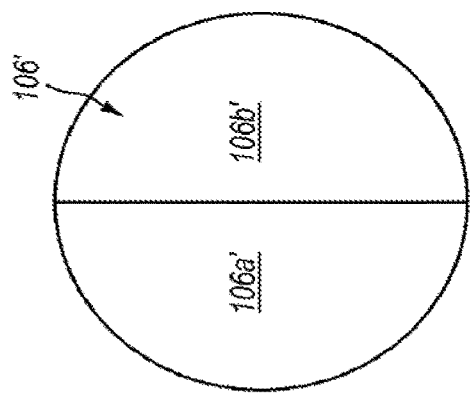
FIGS. 11A-11C show before and after cross-section elevation views and a top view (after) by which a flat surface may be laser cut to include a lower step portion and an upper step portion.
Figure 11B:
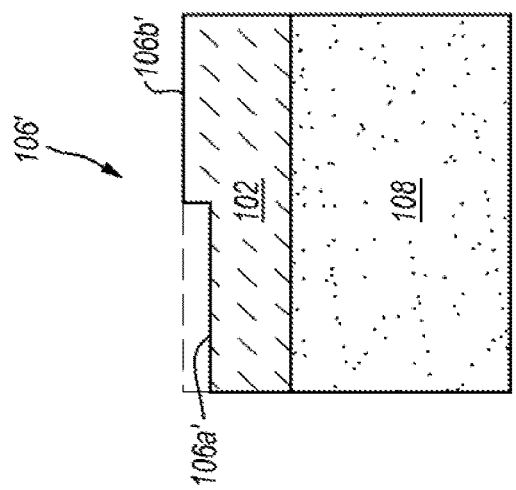
Figure 11A:
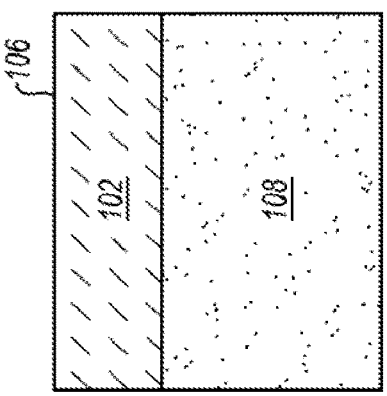

Laser cutting is not limited to removal of topographical protrusions, but may be used to achieve any of various desired shapes (e.g., non-planar shapes). For example, as shown in FIGS. 8A and 8B, an initially non-flat surface 106 may be laser cut to result in a flat surface 106', a flat surface 106 (FIG. 9A) may be laser cut to result in a non-flat, convex surface 106' (FIG. 9B), or a flat surface 106 (FIG. 10A) may be laser cut to result in a non-flat, concave surface 106' (FIG. 10B). Such concave or convex surfaces may be useful for convex or concave bearings. FIGS. 11A-11C show laser cutting of an initially flat surface 106 so as to include a lower step portion 106a' and an upper step portion 106b'. Other geometries may be formed in further embodiments. For example, the initial surface may be convex or concave and then be laser formed to a final convex or concave shape.

FIGS. 12A and 12B show a top plan view and an elevation view, respectively, of a finished surface 106' that may include multiple recesses or pockets 136. FIGS. 13A-13B show a top plan view and an elevation view, respectively, of a finished surface 106' that may include multiple protrusions 134 that may be of any shape.

FIGS. 14A and 14B show a top plan view and a cross-sectional view, respectively, of a shaped surface 106' that may be laser cut to include multiple facets 106a'-106e'. Such shapes may be useful in PDC anvils, gem cut PCD, polycrystalline boron nitride, silicon carbide, etc. According to another embodiment, such laser cutting may be employed to laser cut a PCD table or PDC to a desired PCD table thickness (e.g., by removing some of the PCD table to achieve a desired thickness).

Figure 15A:
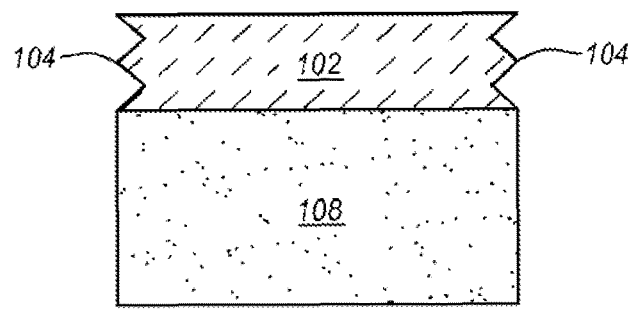
FIGS. 15A-15C show cross-sectional views of additional shaping that may be achieved along the outside diameter of the PCD table through laser cutting according to various embodiments.
Figure 15B:
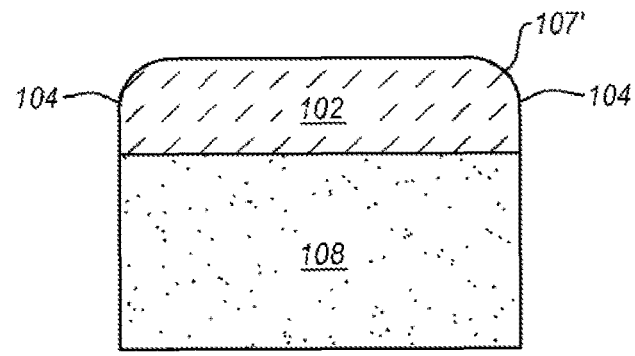
Figure 15C:
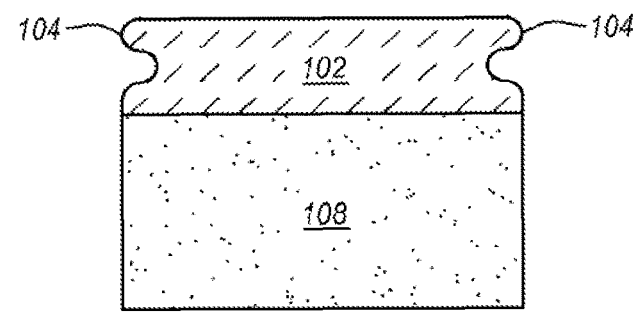

FIGS. 15A-15C show cross-sectional views of additional shaping that may be achieved along the outside diameter of the diamond table through laser cutting according to various embodiments. For example, FIG. 15A shows a cross-sectional view of a PDC including a PCD table 102 in which the peripheral edge 104 has been laser cut to include a serrated tooth pattern. FIG. 15B shows a cross-sectional view of a PDC including a PCD table 102 in which the peripheral edge 104 has been laser cut to include a radius chamfer 107'. FIG. 15C shows a cross-sectional view of a PDC including a PCD table 102 in which the peripheral edge 104 has been laser cut to include a curved, radiused recess formed into the peripheral edge 104. In some embodiments, the PCD table 102 exhibit two or more of a serrated tooth pattern (FIG. 15A), a radius chamfer (FIG. 15B), or a curved radiused recess (FIG. 15C). In light of the many disclosed examples of laser cutting to achieve a desired shape, one of skill in the art will appreciate that numerous other shapes may also be achieved.

Any suitable laser may be used for laser cutting the PCD tables and/or PDCs. For example, solid state lasers, gas lasers, or chemical lasers may be employed. One particularly suitable laser is a ytterbium fiber laser. Other suitable lasers may include Nd:YAG lasers, $CO_2$ lasers, and copper vapor lasers. In an embodiment, the power of the laser may be between about 1 watt and about 1000 watts, about 1 watt to about 500 watts, or about 1 watt to about 100 watts. In another embodiment, laser power may be between about 5 watts and about 50 watts. In another embodiment, laser power may be between about 10 watts and about 30 watts (e.g., about 20 watts).

IV. Rotary Drill Bits and Other Structures Including PDCs

The PDCs formed according to the various embodiments disclosed herein may be used as PDC cutting elements on a rotary drill bit. For example, in a method according to an embodiment of the invention, one or more PDCs may be received that were fabricated according to any of the disclosed manufacturing methods and attached to a bit body of a rotary drill bit.

Figure 16:
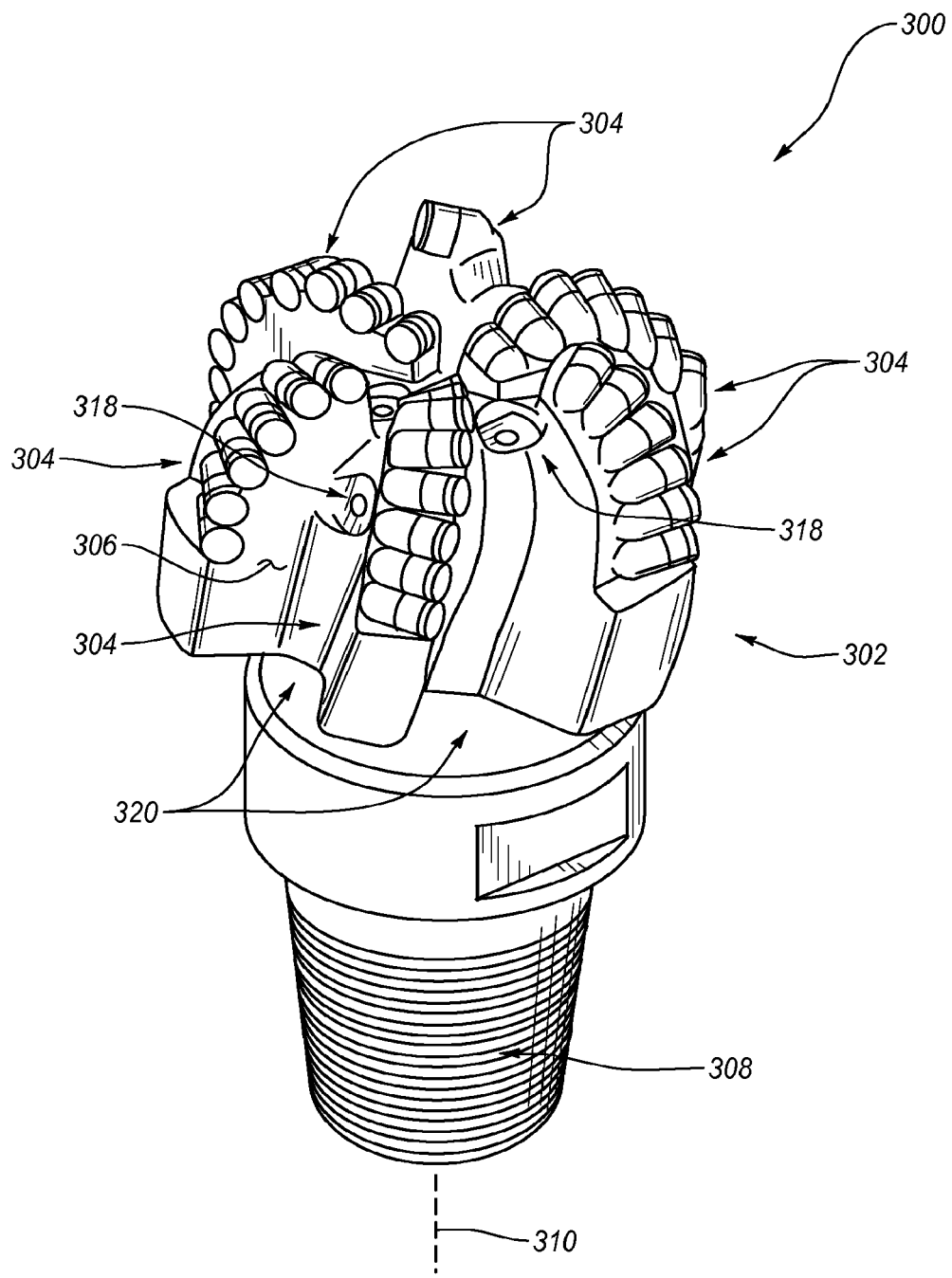
FIG. 16 is an isometric view of an embodiment of a rotary drill bit that may employ one or more of PDCs manufactured according to the any of the disclosed embodiments.
Figure 17:
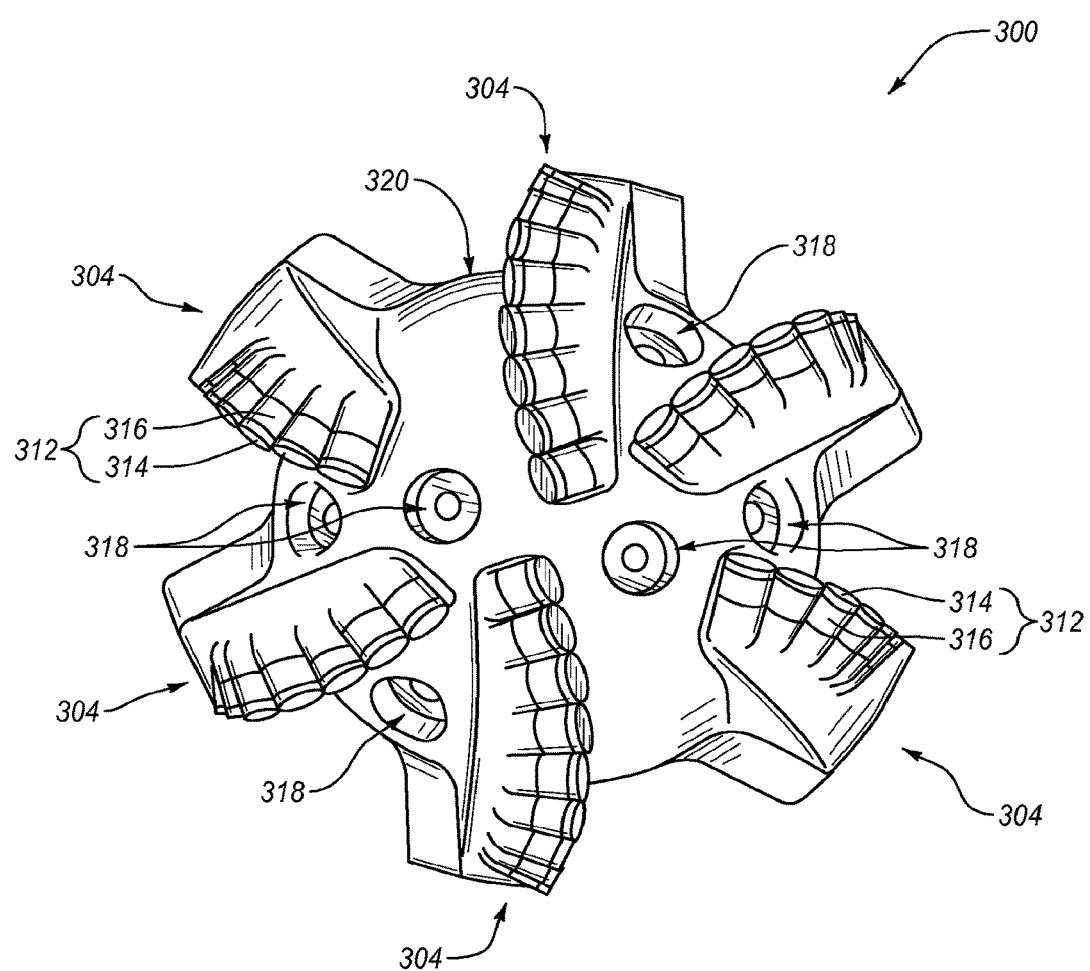
FIG. 17 is a top elevation view of the rotary drill bit shown in FIG. 16.

FIG. 16 is an isometric view and FIG. 17 is a top elevation view of an embodiment of a rotary drill bit 300 that includes at least one PDC configured and/or fabricated according to any of the disclosed PDC embodiments. The rotary drill bit 300 comprises a bit body 302 that includes radially and longitudinally extending blades 304 having leading faces 306, and a threaded pin connection 308 for connecting the bit body 302 to a drilling string. The bit body 302 defines a leading end structure for drilling into a subterranean formation by rotation about a longitudinal axis 310 and application of weight-on-bit. At least one PDC, configured according to any of the previously described PDC embodiments, may be affixed to the bit body 302. With reference to FIG. 17, each of a plurality of PDCs 312 is secured to the blades 304 of the bit body 302 (FIG. 16). For example, each PDC 312 may include a PCD table 314 bonded to a substrate 316. More generally, the PDCs 312 may comprise any PDC disclosed herein, without limitation.

In addition, if desired, in some embodiments, a number of the PDCs 312 may be conventional in construction. Also, circumferentially adjacent blades 304 define so-called junk slots 320 therebetween. Additionally, the rotary drill bit 300 includes a plurality of nozzle cavities 318 for communicating drilling fluid from the interior of the rotary drill bit 300 to the PDCs 312.

FIGS. 16 and 17 merely depict one embodiment of a rotary drill bit that employs at least one PDC fabricated and structured in accordance with the disclosed embodiments, without limitation. The rotary drill bit 300 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs disclosed herein (e.g., PDC 100 of FIG. 1A) may also be utilized in applications other than cutting technology. For example, the disclosed PDC embodiments may be used in wire dies, bearings, artificial joints, inserts, cutting elements, heat sinks, jewelry, and tooling such as shaped dies and shaped punches. PDCs including non-planar surfaces (e.g., exterior surface 106) may be particularly useful in applications such as jewelry and tooling. Thus, any of the PDCs disclosed herein may be employed in an article of manufacture including at least one PCD table or compact.

Thus, the embodiments of PDCs disclosed herein may be used in any apparatus or structure in which at least one conventional PDC is typically used. In an embodiment, a rotor and a stator, assembled to form a thrust-bearing apparatus, may each include one or more PDCs (e.g., PDC 100 of FIG. 1A) configured according to any of the embodiments disclosed herein and may be operably assembled to a downhole drilling assembly. U.S. Pat. Nos. 4,410,054; 4,560,014; 5,364,192; 5,368,398; 5,480,233; 7,552,782; and 7,559,695, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of forming a polycrystalline diamond compact having a selected geometry, the method comprising
providing a precursor polycrystalline diamond compact including a polycrystalline diamond table attached to a substrate, the polycrystalline diamond table formed at a sintering pressure of at least about 7.5 GPa, the polycrystalline diamond table including an upper surface and a lateral surface;
applying laser energy to a portion of the upper surface of the polycrystalline diamond table to remove diamond material therefrom to form at least one groove offset inwardly and spaced from the lateral surface by a portion of the polycrystalline diamond table; and
removing at least a portion of the substrate extending laterally beyond the at least one groove of the polycrystalline diamond table to form the polycrystalline diamond compact having the selected geometry.

2. The method of claim 1, wherein the at least one groove includes at least one annular groove in top plan view.

3. The method of claim 1, wherein removing at least a portion of the substrate extending laterally beyond the at least one groove includes removing the at least a portion of the substrate by grinding, lapping, electrical-discharge machining, or combinations thereof.

4. The method of claim 1, wherein the polycrystalline diamond table includes a generally cylindrical polycrystalline diamond and the substrate includes a generally cylindrical substrate.

5. The method of claim 1, wherein the polycrystalline diamond table is at least partially leached.

6. The method of claim 1, wherein the polycrystalline diamond table is unleached.

7. The method of claim 1, wherein the polycrystalline diamond table exhibits a $G_{ratio}$ of about $8.0 \times 10^6$ to about $15.0 \times 10^6$.

8. The method of claim 1, wherein the portion of the upper surface of the polycrystalline diamond table is removed to a first depth as a result of a first pass of the laser energy, and a remainder of the portion of the upper surface of the polycrystalline diamond table adjacent to and deeper than the portion removed in the first pass is removed as a result of at least one subsequent pass of the laser energy so that the portion is progressively removed through multiple subsequent passes of the laser energy, and wherein a depth of diamond material removed during each pass of the laser energy is sufficiently low so as to prevent substantial thermal damage to the polycrystalline diamond table.

9. The method of claim 8, wherein each of the subsequent passes of the laser energy removes a depth of about 0.003 inch to about 0.05 inch of diamond material as the portion of the upper surface of the polycrystalline diamond table is progressively ablated.

10. The method of claim 1, wherein the at least one groove terminates at a vertex.

11. The method of claim 1 wherein applying laser energy to a portion of the upper surface of the polycrystalline diamond table to remove diamond material therefrom to form at least one groove includes forming the at least one groove wide enough to accommodate an electrical-discharge machining wire.

12. The method of claim 1, further comprising, after applying the laser energy to the portion of the upper surface of the polycrystalline diamond table, removing at least a portion of the substrate by wire electrical-discharge machining.

13. A method of forming a polycrystalline diamond compact having a selected geometry, the method comprising
providing a precursor polycrystalline diamond compact including a polycrystalline diamond table attached to a substrate, the polycrystalline diamond table including a plurality of bonded diamond grains defining a plurality of interstitial regions therebetween, the polycrystalline diamond table further including an upper surface and a lateral surface, the polycrystalline diamond table further including:
an unleached region adjacent to and extending from the substrate towards the upper surface, the unleached region including at least one of a catalyst or an infiltrant disposed in at least a portion of the interstitial regions thereof; and
an at least partially leached region extending from the upper surface to the unleached region, the at least partially leached region having at least one of the catalyst or the infiltrant at least partially removed from at least a portion of the interstitial regions thereof;
applying laser energy to a portion of the upper surface of the polycrystalline diamond table to remove diamond material therefrom to form at least one groove offset inwardly and spaced from the lateral surface by a portion of the polycrystalline diamond table; and
removing at least a portion of the substrate extending laterally beyond the at least one groove of the polycrystalline diamond table to form the polycrystalline diamond compact having the selected geometry.

14. The method of claim 13, wherein applying laser energy to a portion of the upper surface of the polycrystalline diamond table to remove diamond material therefrom to form at least one groove includes forming the at least one groove through at least the at least partially leached region.

15. The method of claim 13, wherein the at least partially leached region includes substantially no catalyst or substantially no infiltrant therein.

16. The method of claim 13, wherein the polycrystalline diamond table exhibits a $G_{ratio}$ of at least about $4.0 \times 10^6$.

17. The method of claim 13, further comprising, after applying laser energy to a portion of the upper surface of the polycrystalline diamond table, removing portions of the polycrystalline diamond table underlying the at least one groove by electrical-discharge machining.

18. A method of forming a polycrystalline diamond compact having a selected geometry, the method comprising
providing a precursor polycrystalline diamond compact including a polycrystalline diamond table attached to a substrate, the polycrystalline diamond table including a plurality of bonded diamond grains, the polycrystalline diamond table further including an upper surface and a lateral surface;
applying laser energy to a portion of the upper surface of the polycrystalline diamond table to remove diamond material from at least one region of the polycrystalline diamond table, wherein the portion of the upper surface of the polycrystalline diamond table is removed to a first depth as a result of a first pass of the laser energy, and a remainder of the portion of the upper surface of the polycrystalline diamond table adjacent to and deeper than the portion removed in the first pass is removed as a result of at least one subsequent pass of the laser energy so that the portion is progressively removed through multiple subsequent passes of the laser energy;
wherein a depth of diamond material removed during each pass of the laser energy is sufficiently low so as to prevent substantial thermal damage to the polycrystalline diamond table; and
subsequent to applying laser energy, removing at least a portion of the substrate underlying the at least one region.

19. The method of claim 18, wherein removing at least a portion of the substrate includes removing the at least a portion of the substrate underlying the at least one region by grinding, lapping, electrical-discharge machining, or combinations thereof.

20. The method of claim 18, wherein removing at least a portion of the substrate includes removing the at least a portion of the substrate underlying the at least one region by grinding.

21. The method of claim 18, wherein the at least one region of the polycrystalline diamond table includes at least one peripheral portion of the polycrystalline diamond table.

22. The method of claim 18, wherein the polycrystalline diamond table including the at least one region thereof removed therefrom defines at least one groove offset inwardly from the lateral surface of the polycrystalline diamond table.

23. The method of claim 18 wherein the selected geometry is non-cylindrical.

24. The method of claim 18, wherein the polycrystalline diamond table includes:
an unleached region adjacent to and extending from the substrate towards the upper surface, the unleached region including at least one of a catalyst or an infiltrant disposed in at least a portion of the interstitial regions thereof; and
an at least partially leached region extending from the upper surface to the unleached region, the at least partially leached region having at least one of the catalyst or the infiltrant at least partially removed from at least a portion of the interstitial regions thereof.

25. The method of claim 24, wherein applying laser energy to a portion of the upper surface of the polycrystalline diamond table to remove diamond material from at least one region of the polycrystalline diamond table includes removing the diamond material from at least the at least partially leached region of the polycrystalline diamond table.

* * * * *